United States Patent
Da Costa Martins et al.

(10) Patent No.: US 11,692,940 B2
(45) Date of Patent: Jul. 4, 2023

(54) METHOD AND APPARATUS FOR CHARACTERISATION OF CONSTITUENTS IN A PHYSICAL SAMPLE FROM ELECTROMAGNETIC SPECTRAL INFORMATION

(71) Applicant: INESC TEC Instituto De Engenharia De Sistemas De Computadoras, Tecnología E Ciência, Oporto (PT)

(72) Inventors: Rui Miguel Da Costa Martins, Oporto (PT); Pedro Alberto Da Silva Jorge, Oporto (PT); Eduardo Alexander Pereira Silva, Oporto (PT); José Miguel Soares De Almeida, Oporto (PT); Alfredo Manuel De Oliveira Martins, Oporto (PT)

(73) Assignee: INESC TEC—Instituto de Engenharia de Sistemas e Computadores, Tecnologia e Ciência, Oporto (PT)

( * ) Notice: Subject to any disclaimer, the term of this patent is extended or adjusted under 35 U.S.C. 154(b) by 236 days.

(21) Appl. No.: 17/259,937

(22) PCT Filed: Jul. 31, 2019

(86) PCT No.: PCT/IB2019/056535
§ 371 (c)(1),
(2) Date: Jan. 13, 2021

(87) PCT Pub. No.: WO2020/026165
PCT Pub. Date: Feb. 6, 2020

(65) Prior Publication Data
US 2021/0270744 A1    Sep. 2, 2021

(30) Foreign Application Priority Data

Jul. 31, 2018 (PT) .......................................... 110894
Aug. 3, 2018 (EP) ..................................... 18187384

(51) Int. Cl.
*G01N 21/71* (2006.01)
*G01J 3/443* (2006.01)

(52) U.S. Cl.
CPC ............ *G01N 21/718* (2013.01); *G01J 3/443* (2013.01)

(58) Field of Classification Search
CPC ............................... G01N 21/718; G01J 3/443
See application file for complete search history.

(56) References Cited

U.S. PATENT DOCUMENTS

2013/0195327 A1*  8/2013  Tanji .......................... G06T 5/10
                                                        382/128
2016/0349174 A1*  12/2016  Washburn .............. G01N 29/46

FOREIGN PATENT DOCUMENTS

CN      107677640 A      2/2018
CN      105224961 B      5/2018
(Continued)

OTHER PUBLICATIONS

Guiseppe Amato et al. "Element detection relying on information retrieval techniques applied to laser spectroscopy", Similarity Search and Applications, ACM, 2 Penn Plaza, Suite 071 New York NY, 10121-0701 USA, Jun. 30, 2011, p. 89-95, XP058003380, DOI: 10.1145/1995412.1995429, ISBN: 978-1-4503-0795-6 Sections 1-3.
(Continued)

*Primary Examiner* — Jamil Ahmed
(74) *Attorney, Agent, or Firm* — Mark M. Friedman

(57) ABSTRACT

The present invention is enclosed in the area of machine learning, in particular machine learning for the analysis of High or Super-resolution spectroscopic data, which typically comprises analysis of highly complex samples/mixtures of substances and/or data with low resolution, for instance Laser-Induced Breakdown Spectroscopy (LIBS). It is an object of the present invention a method of computational self-learning for characterization of one or more constituents
(Continued)

in a sample, from electromagnetic spectral information of such sample, which changes the paradigm associated with prior art methods, by using only sub-optical spectral information, i.e., obtaining the resolution of the spectral information and thereby be able to extract spectral lines—thus determining a spectral line position—from such spectral information, hence avoiding all the uncertainty associated with pixel based methods. It is also an object of the present invention a computational apparatus configured to implement such method.

17 Claims, 5 Drawing Sheets

(56) References Cited

FOREIGN PATENT DOCUMENTS

| CN | 105352918 B | 5/2018 |
|---|---|---|
| WO | 2018060967 A1 | 4/2018 |

OTHER PUBLICATIONS

Amato G et al: "Progress towards an unassisted element identification fro Laser Induced Breakdown Spectra with automatic ranking techniques inspired by text retrieval", Spectrochimica Acta. Part B: Atomic Spectroscopy, New York, NY, US, US, vol. 65, No. 8, Aug. 1, 2010, pp. 664-670, XP027144316, ISSN 0584-8547, Sections 2.2-2.3.

* cited by examiner

METHOD AND APPARATUS FOR CHARACTERISATION OF CONSTITUENTS IN A PHYSICAL SAMPLE FROM ELECTROMAGNETIC SPECTRAL INFORMATION

FIELD OF THE INVENTION

The present invention is enclosed in the area of machine learning, in particular machine learning for the analysis of high or super-resolution spectroscopic data, which typically comprises analysis of highly complex samples/mixtures of substances, for instance Laser-Induced Breakdown Spectroscopy (LIBS). The method disclosed herein is within the class of explainable artificial intelligence.

PRIOR ART

Plasma emission spectroscopy, in particular Laser Induced Breakdown Spectroscopy (LIBS), is a high resolution and highly resolved technology. The full potential of plasma-emission spectroscopy is provided by the interpretation of the dynamical information structure of emission lines acquired during the molecular breakdown ionization process, whereby each different constituent has a different plasma emission's dynamic. This dynamical 'fingerprint' contains all the information about chemical elements and/or their isotopes, molecules and/or their conformations, states and structure present in a physical sample. The plasma emission (e.g. LIBS) is typically used in the analysis of complex samples/mixtures of substances, either occurring in nature or man-made.

The identification of chemical elements and molecules would be a straightforward operation if the instrumentation had infinite optical resolution and only quantum uncertainty exists because the emission lines of each element are well characterized and a direct matching against certified databases (e.g. NIST atomic spectra lines database) would be enough to assess the physical sample. However, the spectral information obtained from a physical sample is the result of complex super-position and convolution of light physical phenomena. Such generates multi-scaled interference of spectral information in light spectra of any complex sample.

The capability of plasma emission spectroscopy systems (e.g. LIBS) to resolve spectral information is limited, i.e. optical spectral resolution, its limited by the number and arrangement of pixels in the CCDs used in the spectroscopy systems. This fact makes it impossible to validate the assumption that spectral lines are exclusive of each element.

In more complex samples, a method using optical spectral resolution is not able to output an accurate identification or quantification since different chemical element present spectral lines at very close wavelengths. For example, Lithium (Li) spectral lines can be miss-identified with: i) Iron (Fe I) (610.329 nm and 670.74 nm) or ii) Tungsten (W) (670.8202 nm); or iii) Titanium (Ti): (610.35 nm and 670.76 nm). Line matching algorithms at optical resolutions are highly probable to fail element identification. Such is a very significant limitation for plasma emission spectroscopy because many elements have significant number of overlapping band regions, as they have an elevated number of lines that may interfere with other elements.

State-of-the-art plasma-emission spectroscopy systems, in particular LIBS systems, are ready to identify and quantify elements in physical samples under low interference between spectral bands. These systems minimize the plasma physics effects, such as, Doppler and Stark broadening by reducing pressure or using modified atmosphere, or by manipulating laser energy/pulse to maximize signal intensity and minimize spectral bands uncertainty at the latent thermodynamic equilibrium. All element identification and quantifications are performed directly in the pixel-based signal, which is a significant drawback, if assessed samples are extremely complex (e.g. minerals or biological samples). Pixel-based methods were implemented to LIBS systems with limited success because the use of convoluted spectral bands does not allow a deterministic identification of constituents present in a physical sample by their spectral lines. During this process, unnecessary interference and uncertainty are introduced, constraining pixel-based methods to probabilistic identification, classification and quantification.

EP1967846 discloses a method to classify or quantify spectra of unknown mixtures of compounds based matching algorithms. However, EP1967846 only perform accurately at analysing pure chemicals or mixtures of pure chemicals, which have non-interference continuous spectral signals within optical resolution, allowing matching against a Raman spectra database of pure or mixtures of chemicals. Complex samples, such as, biological samples exhibit so much multi-scale interference, that spectral features cannot be directly related to the composition.

Moreover, the capability of state-of-the-art methods to identify, quantify, and predict the composition of a physical sample is still dependent on previous knowledge by a human expert (Hahn and Omenetto, 2010). Therefore, the development of models for quantification highly depends on providing a correct context to spectral line identification (Cousin et al., 2011). In this sense, two main machine learning methodologies are known in the art, specifically chemometrics and neural networks/deep learning.

Chemometrics is a standard approach at providing methods of projection of latent variables. This methodology fails to provide application for complex samples, being confined to samples with simpler composition or near pure chemicals such as pharmaceutical drugs or samples with low composition variability. For example, chemometric models, such as partial least squares (PLS), are not able to quantify correctly the lithium content from lithium containing ore, because the correct plasma emission information, as well as, interference between spectral lines, is not correctly modelled by chemometrics techniques.

Support vector machines, neural networks/deep learning methods provide a deterministic non-linear mapping between input and output.

All these methods are unable to find the correct co-variance between composition, spectral bands and their interference pattern. This is due to the super-imposed and multi-scale interference between all elements, as well as, all the physics of plasma emission. The data is so vast and detailed, that finding the right network architecture that can predict composition is an extremely inefficient process of machine learning. These are global models, and as new data is gathered, new global models need to be created.

Furthermore, these state-of-the-art methods do not provide a way to determine if a given sample is predictable or not; and have significant difficulties in detecting outliers.

The lack of this characteristic, is the major hurdle of machine learning (ML) methods in critical fields, such as medicine or dangerous industrial applications, where fail safe operation is necessary.

Current machine learning present significant series of limitations for plasma induced spectroscopy information processing, such as laser induced plasma spectroscopy (LIBS) to its full theoretical potential for: i) measuring and identifying chemical elements and their isotopes; ii) measuring molecular structure and compositions; iii) following chemical reactions enhanced by plasma; iv) identifying, characterizing and qualification of materials, their molecular configuration and chemical element composition; v) identification and quantification of biological materials by plasma fingerprinting; vi) analysing the same sample in different states (solid, liquid or gas) at different pressures or temperatures; and vii) dealing with measurements at different pressures and temperatures.

Moreover, current machine learning technologies such as SVMs and ANN often rely on black-box approaches. Despite positive results, these methods offer no explainable interpretation of results for interoperability, interpretation and interaction that allows humans to control and interact with, so that, results and inner workings of algorithms are both debugged, as well as, predictions results are validated and curated according to human knowledge and reasoning. This is a serious limitation for plasma emission spectroscopy, where diagnosing how emission lines wavelengths and their intensities interfere and contribute for identification, classification and quantification, is essential for the correct physical modelling and accurately forecast new and unknown data, as well as, creating cured and scientifically validated databases that support this horizontal technology across many fields of application.

The present invention includes a machine learning method and system that provides analytical accuracy compositional prediction in highly complex samples, in real-time and at the point-of-use/point-of-care, thereby overcoming such known methods.

SUMMARY OF THE INVENTION

It is therefore an object of the present invention a method for characterization of one or more constituents in a physical sample from electromagnetic spectral information of such physical sample, each constituent consisting of one or combinations of chemical elements and/or their isotopes, molecules and/or their conformations or states, comprising the following steps:
- obtaining the resolution of electromagnetic spectral information, preferably comprising one or more electromagnetic spectrums, corresponding to said physical sample,
- extracting, where the spectral resolution corresponding to the spectral information is sub-optical, one or more spectral lines from said electromagnetic spectral information,
- projecting said spectral lines into a sample point of a deterministic feature space, such deterministic feature space consisting of a multiple dimension vector space comprising a plurality of spectral lines with a predetermined vector basis, such plurality of spectral lines with a predetermined vector basis:
  - being stored in a database and having been obtained by sub-optical spectral resolution extraction, and
  - corresponding to a plurality of known constituents,
- wherein each dimension of said multiple dimension vector space is a prediction feature of the one or more constituents in said physical sample to which the electromagnetic spectral information corresponds, such prediction feature providing determination of quantity, classification and/or identification of one or more constituents in said physical sample.

The method disclosed herein uses sub-optical spectral data to extract spectral lines with improved accuracy, using this information as feature variables to identify and/or quantify one or more constituents in a physical sample. Therefore, two major advantages arise in comparison to the state-of-the-art that is based on pixel-based technology: i) the access to accurately defined spectral lines, allows the deterministic assignment of observed spectral lines to their expected theoretical wavelengths and transition probabilities described in Kramida et al, 2018; ii) extracting dynamical breakdown molecular ion emission lines (i.e. dynamic plasma-emission analysis) provides information on molecular structure, allowing highly accurate constituent identification, classification and quantification. Instead of providing a global model that has to be trained with big-data databases, the presented method searches the existing data in the deterministic feature space for spectral lines and samples that provide adequate interpretation (explainable models) and accurately identify, classify and quantify constituents. It further allows humans to understand the model (explainable artificial intelligence) by providing through an explainable interface the contribution of spectral lines for the identification and quantification of constituents. Such contribution can be further used to understand plasma-emission dynamics and breakdown by providing quality data for quantum mechanics mathematical atomic and molecular models. Dynamic plasma-emission analysis further provides valuable information for the development of new and advanced instrumentation, by providing information that can be interpreted by humans. Said sample points may be described as coordinates of a particular sample electro-magnetic spectra in the feature space.

The method can self-learn from existing or new added data and can self-diagnose about capacity to predict before any prediction is made. It further comprises the capacity to self-teach what spectral lines should be used to interpret, by using the theoretical knowledge for self-supervising model construction. The capacity of autonomous continuous learning and interaction with human interpretation, is extremely necessary for applications in areas of complex variability, such as, geology, medicine and biotechnology; where plasma-induced big-data databases do not exist.

Accordingly, the method of the present invention changes the paradigm associated with prior art methods, by using only sub-optical spectral information that is, extracting spectral lines below the optical resolution of the spectrometer system. Such is possible because pixel density is higher than optical resolution and spectral lines incident on the charge-coupled device (CCD) sensor are broadened through consecutive pixels of a linear CCD. Therefore, determining a spectral line position, from such spectral information, mitigates the uncertainty associated with pixel-based methods. This ultra-low wavelength error in spectral lines provides accurate extraction of constituent information, allowing its or their identification, classification, quantification and determining the chemical structure from the electromagnetic spectra. Moreover, extremely low error in the determination of spectral lines turns the identification of elements or small molecules ion emission, a deterministic process, opposing to a probabilistic process in previous pixel-based methods.

The defined method in claim 1 uses the plurality of spectral lines of all said chemical elements and/or their isotopes, molecules and/or their conformations or states, as the variables vector basis, from which, plasma emission information databases are expanded into the matrix form containing all the possible spectra at the latent thermodynamic equilibrium, or, into a tensor format, containing all the time-dependent plasma emission spectra for a plurality of samples. These matrix or tensor is used to spawn a multiple dimension vector space, said deterministic feature space, which is a representation of one or more physical sample features in the feature space domain of all existing spectral lines. All previously known spectral lines are stored in a database, corresponding to the spectral lines extracted for a plurality of constituents.

Determined prediction features provide information on the constituents of the sample, which consists of a physical sample from which electromagnetic spectral information was obtained from, such obtained information consisting of information on quantity, classification or identification of one or more constituents present in the physical sample.

As above indicated, constituents may consist of one or combinations of chemical elements and/or their isotopes, molecules and/or their conformations or atomic states, shells and configurations thereby including, but not being limited to, examples as pure elements, molecules or substances, metal alloys and their combinations, in diverse conformations or states, such constituents being present and thereby forming the whole or part of the physical sample.

Vector basis consists of a known concept, and may be defined as linear independent, orthonormal vectors that spawn a feature space. Reference to the conformation of a molecule represents a particular arrangement of atoms in molecules, whereas the states represent a particular arrangement of the electron cloud of individual atoms. The deterministic feature space represents features, in the present case spectral lines, thereby allowing to produce a same output. Spectral lines may consist of emission lines.

The method of the present invention is a horizontal technology applicable to fields where minimally destructive and minimally invasive applications are mostly needed, such as: healthcare, animal care, biotechnology, pharmaceuticals, food and agriculture, raw materials and minerals, micro and nanotechnology, molecular biology, inland security and military, chemical and nano-engineered materials. It does not require preparation of physical samples in a laboratory. The spectral information of the present method is preferably obtained from a technology which enables plasma inducement, namely Laser-Induced Plasma Spectroscopy (LIBS).

The method of the present invention provides self-learning, therefore non-supervised learning from data, as well as implicit auto-supervised learning from data, i.e., self-teaching.

It is also an object of the present invention a computational apparatus with self-learning for characterization of one or more constituents in a physical sample, each constituent consisting of one or combinations of chemical elements and/or their isotopes, molecules and/or their conformations or states, wherein it is configured to implement the method of the present invention in any of the described embodiments, preferably further comprising a spectroscopy device able to induce a plasma state in a physical sample, said spectral information being obtained from said spectroscopy device, the spectroscopy device preferably consisting of a LIBS device. The apparatus may comprise a plasma inducing spectroscopy device and be configured to control such spectroscopy device.

Furthermore, it is also an object of the present invention a non-transitory storage media including program instructions executable to carry out the method of the present invention in any of the described embodiments.

DETAILED DESCRIPTION

Figure 1:
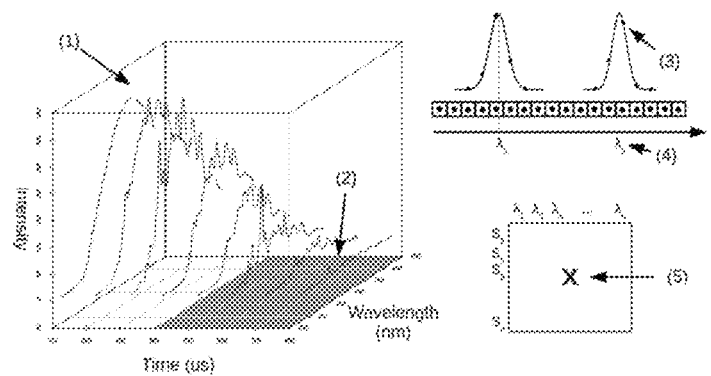
FIG. 1 presents a typical dynamical LIBS signal from laser ablation to ion emission at the latent thermodynamic equilibrium and sub-optical spectral lines extraction with corresponding data storage in the matrix format.

In an inventive aspect of the method of the present invention, it further comprises the following steps:
selecting a minimum of neighbouring sample points within said deterministic feature space, corresponding to a known constituent quantity, such that the projected sample point maximize the covariance with the corresponding minimum neighbouring points, selecting, from the minimum neighbouring points, exclusive, interference and unique spectral lines, thereby deriving a local feature space within the neighbouring sample points, and predicting the quantification of the constituent from the physical sample to be quantified by correlating the known constituents from the local feature space, taking into consideration the projected spectral lines of said physical sample to be quantified into the covariance feature space of the selected neighbouring sample points.

Hence, the computational method—after projecting the extracted spectral lines from a physical sample into the deterministic feature space —, determines the corresponding minimum neighbouring points, that is, samples existing in the database that maximize the co-variance corresponding to a known constituent. The method further comprises the creation of a local feature space, a sub-space of the deterministic feature space, composed only by the minimum neighbouring points exclusive, interference and unique spectral lines as variables that spawn this local multiple dimension vector space. The method comprises the determination of: i) exclusive spectral lines—as those lines that only belong to a particular ion element or molecule; ii) interference spectral lines—spectral lines that are superimposed and cannot be resolved with sub-optical extraction; and iii) unique spectral lines—spectral lines that belong only to a particular constituent plasma dynamics. The selection of exclusive, interference and unique spectral lines is also a significant evolution when compared to pixel-based methods, where no selection is feasible because the feature space of these methods is not deterministic. Quantification of a particular constituent is thereafter performed by determining the direction that maximizes co-variance between spectral features and quantity of a particular constituent. Said selected neighbouring sample points may be described as selected samples within a Euclidean short distance in multi-dimensional feature space that sustain co-variance for local model generation.

In another inventive aspect of the method of the present invention, it further comprises the following steps:

selecting a minimum of neighbouring sample points within the deterministic feature space, such that such neighbouring sample points belong to a particular class, by determining if the projected sample point is inside a predetermined region of the deterministic feature space, such region being delimited by a non-linear logistic boundary, and for the minimum of neighbouring sample points delimited inside said region, selecting exclusive, interference and unique spectral lines to derive a local feature space, thereby providing matching within the neighbouring sample points and said sample point.

Such method thereby efficiently enables classification and/or identification of constituents present in the physical sample whereby, if the projected spectral lines are inside a predetermined region of the deterministic feature space (being delimited by a non-linear logistic boundary, a boundary delimiting a particular class of constituents), the physical sample is said to belong to a known particular class of physical samples (referring to constituents). Identification of constituents, chemical elements and/or their isotopes, molecules and/or their conformations or states, is further performed by matching the exclusive, interference and unique spectral lines of neighbouring sample points and said sample point, such unique spectral lines being Spectral lines not observable in other constituents.

Furthermore, and in an embodiment comprising the further features of claim 4—in order to determine the non-linear logistic boundary mentioned above —, it searches the boundary between two or more different classes of samples in the deterministic feature space by determining the search direction that minimizes the error of the logistic function, determining also the class samples, said extreme support discrimination samples (Samples that sustain the logistic boundary of discrimination between samples), that define locally the logistic boundary. By applying recursively this method, the said non-linear logistic boundary is determined for a particular class. Said search direction provides direction search in the feature space.

Under the further embodiment of the method of the present invention as defined in claim 5, once a class is pre-determined, identification and quantification can be performed more directly as the class exclusive, interference and unique spectral lines are known. Optionally, and under the further embodiment of claim 6, also the chemical structure is determined. The non-contributing plasma effects may consist of scattering, broadening, continuous background. The relevant lines may consist of lines that contain quantification effects. The matching index may be described as a similarity metric.

Another inventive aspect of the method of the present invention arises where the referred electromagnetic spectral information is obtained from a plasma inducing spectroscopy method, preferably Laser-Induced Breakdown Spectroscopy (LIBS).

Optionally, in a specific embodiment of that above described, the referred electromagnetic spectral information comprises spectral information variation in time, for a certain time lapse, said plasma inducing spectroscopy method having impacted upon the physical sample during such time lapse.

Thus, the inclusion of a plasma inducing spectroscopy methodology in combination with obtaining spectral information throughout time, during a time lapse, enables further characterisation of the physical sample. Plasma inducing spectroscopy methodology—such as Laser-inducing plasma spectroscopy—provides molecular breakdown during the plasma phase, leading to characteristic molecular structure dissociation of chemical bonds at specific energies of ionization, thereby providing information about the chemical structure of sample constituents.

In practice, several electromagnetic spectrums corresponding to several instants in time will be comprised in the referred electromagnetic spectral information, thereby enabling a better/deeper knowledge of the constituents quantities, classifications or identifications, for instance better determining—and without resort to several techniques and laboratory preparation—conformation or states of the constituents.

In an embodiment of the method of the present invention, the referred variation in time is discrete, the electromagnetic spectral information thereby comprising a plurality of electromagnetic spectrums, each spectrum corresponding to an instant in the referred time lapse, whereby spectral lines are extracted for each spectrum of said plurality of spectrums, thereby resulting in one or more spectral lines for each spectrum.

In another aspect of the method of the present invention, the referred deterministic feature space is obtained by a hierarchical multi-block technique or tensor decomposition, thus a method for fusing feature spaces into a single superset.

In an aspect of the method of the present invention, selecting the minimum of neighbouring sample points within the said feature space further comprises the steps of claim 11.

In another aspect of the method of the present invention, it further comprises the additional steps of claim 12.

In a preferred embodiment of the computational apparatus of the present invention, it comprises a spectroscopy device, such spectroscopy device preferably consisting of a LIBS device from which said spectral information is obtained from, the computational apparatus being further configured to obtain spectral information from the spectroscopy device during a predetermined time lapse and thereby obtaining spectral information which consists of a plurality of electromagnetic spectrums corresponding to several instants in said predetermined time lapse, the plasma inducing spectroscopy device having impacted upon the physical sample during such time lapse.

Embodiments

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

This document describes a method for characterizing one or more constituents in a physical sample from electromagnetic spectral information of such physical sample. By constituent it is intended to mean one or combinations of chemical elements and/or their isotopes, molecules and/or their conformations or states.

In the invention described herein, electromagnetic spectral information of a physical sample is acquired by plasma emission spectroscopy. In a preferential embodiment LIBS is used as plasma emission spectroscopy technique. The said electromagnetic spectral information taken to a physical sample $S_i$, is recorded for a given set of: laser energy and pulse function, wavelengths; atmospheric composition, pressure and temperature.

FIG. 1 presents a typical LIBS signal, which encompasses the following phases: laser ablation, plasma expansion with molecular breakdown and ionization; plasma cooling and electron decay (1), and ion atomic emission at the latent thermodynamic equilibrium (LTE) (2).

For each sample $S_i$, spectrum intensity is recorded at different wavelengths ($\lambda$) along time (t), being stored in the matrix format as $L_i(\lambda,t)$. When a plurality of physical samples S LIBS spectra are recorded, these are stored in the 3-way tensor format $L(S, \lambda,t)$.

Most state of the art LIBS systems use only the delayed information, to obtain minimum black body radiation, minimum Doppler and Stark broadening, and solely record measurements at the LTE. In this case, each sample is represented by the vector $x_i$, the recorded spectrum at different wavelengths, and $X(S, \lambda)$ the recorded spectrum at LTE for a plurality of physical samples.

The present invention introduces the feature of sub-optical spectral line extraction, whereby spectral bands are registered at pixel positions (3) are fitted to adequate point-spread-functions to extract the spectral line wavelength at the maximum of intensity (4). Therefore, results are recorded as sub-optical spectral lines for a plurality of samples $X(S, \lambda)$ (4), significantly reducing the wavelength error in the analysis of complex samples observed when pixel-based values are used.

Figure 2:
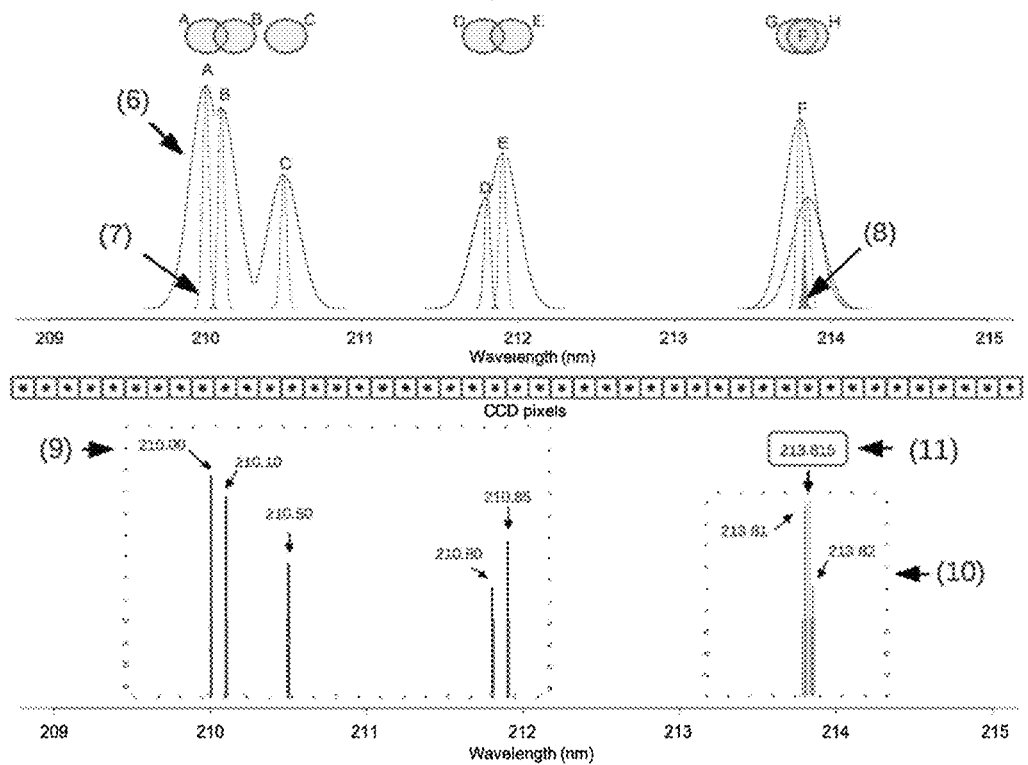
FIG. 2. introduces the effects of interference in sub-optical spectral lines extraction, how spectral bands are deconvoluted and spectral lines resolved and extracted. It further introduces the concept of exclusive (9) and interferent (11) spectral lines.

Reference is made to FIG. 2 to explain introduces the effects of interference in sub-optical spectral lines extraction and how spectral lines are stored as variables. In the invention disclosed herein spectral bands are deconvoluted (6) taking into consideration the effects of optical components (7) (slit, grating and pixel-size/density), Doppler and Stark broadening. In detail, spectral lines are resolved, if the probability interference (8) of the deconvoluted bands is below a given threshold optimized against atomic spectral lines databases. If the resolved bands and corresponding spectral lines belong only to a particular element, these are considered exclusive spectral lines (9). Unresolved or non-exclusive spectral lines (10) are considered an interferent spectral line (11). The extracted lines are stored as exclusive and interferent, and define the $\lambda$ dimension of $X(S, \lambda)$ or $L(S, \lambda,t)$.

Figure 3:
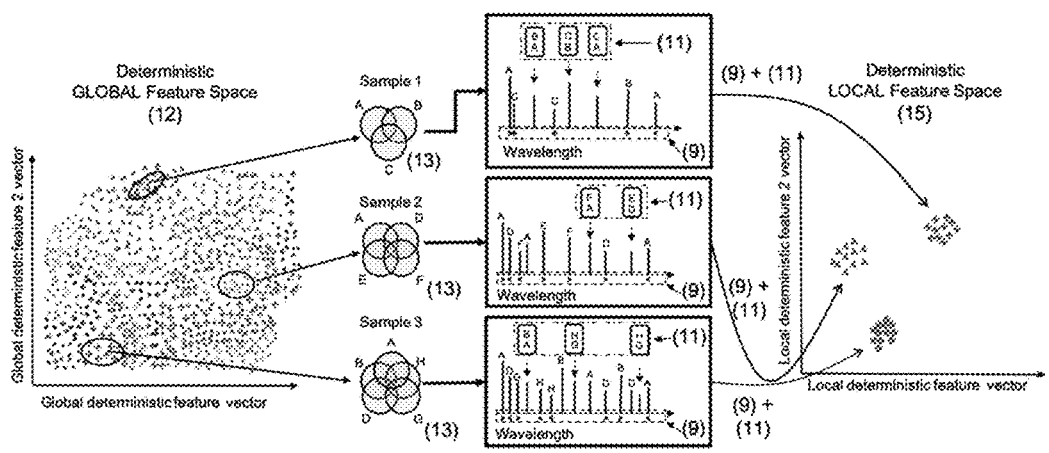
FIG. 3. shows a specific embodiment of how the deterministic local feature space (15) is built from the deterministic global feature space (12), specifically an embodiment where three samples composed by the constituents (13) are analysed. Exclusive (9) and interferent (11) spectral lines may be determined and used as local deterministic feature vectors to build the deterministic local feature space (15). Different regions of the deterministic global feature space (12) represent the combination of particular exclusive (9) and interferent (11) spectral lines for a plurality of samples. Sample clusters composed of different constituents (13), provide a spectral lines fingerprint of the constituent, being possible to assemble with these lines, a sub-space of the global feature space, the said local deterministic feature space (12).

FIG. 3. demonstrates $X(S, \lambda)$ or $L(S, \lambda,t)$ characterization into different regions of the deterministic global feature space (12), representing different combinations of the exclusive and interferent spectral lines for a plurality of samples. Sample clusters composed of different constituents (13), show different exclusive (9) and interferent (11) spectral lines, resulting into unique spectral lines (14), a spectral 'fingerprint' of the constituent.

From the global exclusive, unique and interferent spectral lines, a sub-space of the global feature space (12), the said local deterministic feature space (15) is constructed using neighbouring sample points class where spectral 'fingerprints' of the constituent. For example, constituents composed by chemical elements A, D, E and F (14) will be located at a particular location of the deterministic global feature space (12).

The creation of the local deterministic feature space (15) is one of the key features concepts of the present invention. The details of the local deterministic feature space (15) allows searching, self-learning and self-supervising of the correct relevant spectral lines information to be used at characterizing a physical sample. For example, constituents composed by elements A, D, E and F (14), will be located at a particular location of the global feature space. Variations in spectral lines around the main spectral features of A, D, E and F due to: i) molecular re-arrangements/structure and combinations by which these elements can form a molecular basis; ii) heterogeneous materials composed by different molecular combinations of the same elements; iii) plasma molecular breakdown dynamics of different molecular configurations and structure that will enhance or reduce the expected lines from pure ion elements and present transient molecular ion during breakdown; iv) matrix effect, whereby each spectral line intensity is affected by the way energy is absorbed and propagated in the plasma; and v) peak broadening effects of pressure and temperature.

The method disclosed herein is also able to quantify constituents in a physical sample in addition to identify the constituents present in the same said physical sample. The constituent quantification process is explained in FIG. 4 where for a given region of the feature space (12) that characterizes the chemical elements spectral lines of physical samples with constituent elements A, D, E and F (14).

Any particular molecular structure composed by the previous elements provides a distinct dynamic and LTE plasma breakdown spectral lines fingerprint, where intensities are further affected by laser power function, matrix effect, pressure and temperature, all of which we refer in this document as 'context of measurement'. In order to quantify of a particular combination of chemical elements, arranged into a particular molecular structure within a given context of measurement, spectral lines, their intensities and corresponding interferences, should be correlated to the concentration of the constituents. Moreover, quantification should be performed using exclusive or interference spectral lines for a particular element, and unique spectral lines in the case of molecules or complex constituents.

Figure 4:
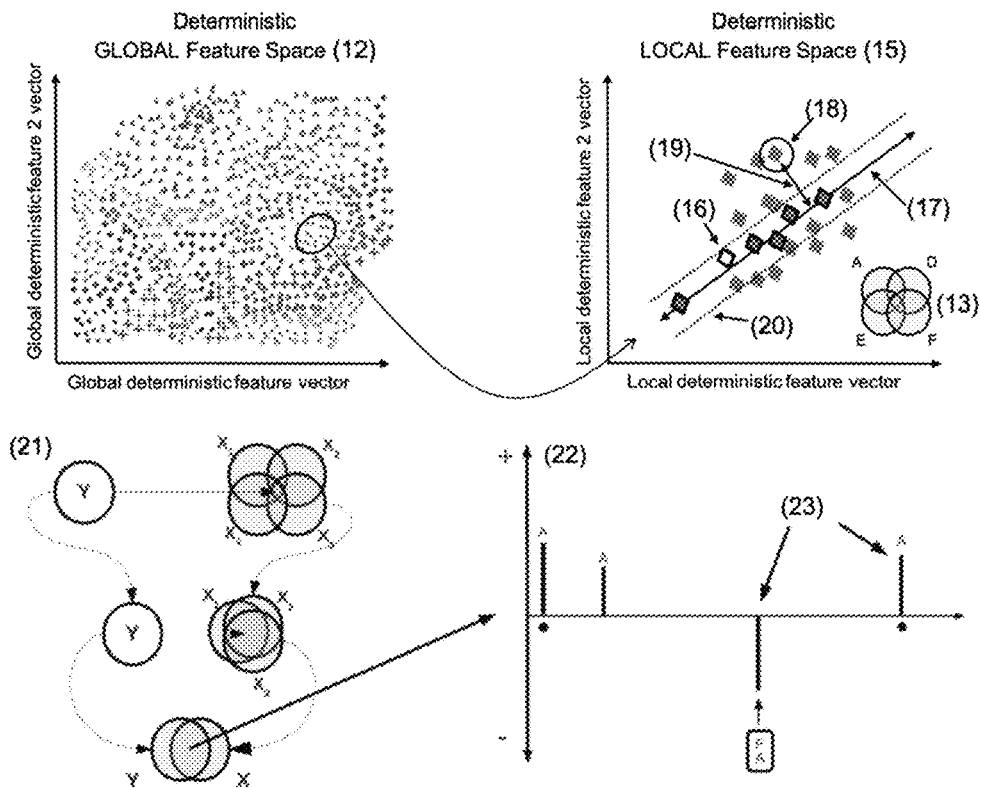
FIG. 4. is a visual explanation of a constituent quantification process (22), whereby spectral lines extracted from an unknown physical sample are projected into a sample point (16) of the deterministic global feature space (12).

Using the example depicted in FIG. 4, molecular combinations of the chemical elements A, D, E and F occupy a particular region of deterministic global feature space (12). Under this assumption, a local deterministic feature space (15) is constructed using the exclusive and interference spectral lines of A, D, E and F and the quantification is performed by analysing relationships between the unknown sample (16) and its sample point neighbours, given spectra lines and their intensities.

In order to quantify element A inside the local feature space, the proposed method searches for a direction in the feature space that maximizes co-variance between the unknown sample point (16) and minimum neighbouring points that correlates to the element A concentration, in order to find a statistically consistent co-variance direction (17), that is, given a known database of sample spectral bands and corresponding element concentrations, it is possible to find samples (minimum neighbouring sample points) that can sustain quantification of A in the unknown sample.

If the unknown samples (16) is inside the confidence interval limits (20), a concentration prediction can be made. Predictability of any unknown physical sample can be assessed as the error distance (19) to the co-variance direction (17). When an unknown sample point (16) is outside (18) the confidence interval (20), the method outputs that an accurate constituents' quantification cannot be predicted.

FIG. 4 presents another key principle of invention, the selection of neighbouring samples and spectral lines information that maximizes the accuracy of quantification. Once a covariance direction is found, the method further optimizes the minimum number of neighbouring sample points and spectral lines that are relevant for quantification, by performing both sample selection and orthogonal filtering (21) of spectral information (Filtering effects that are orthogonal to the desired prediction). Such operations, allow to remove plasma emission information that does not quantifies the constituent A, allowing human interpretation (22). For example, the quantification of A, under the configuration A, D, E and F is given by the positive contributions (23) of two exclusive lines of A, one unique 'context based' line of A, and the negative contribution (23) of an interference line AF. A human observer, trained in the art, understands that the quantification is being performed using the correct information, since A contributions are non-negative, and the interference with F reduces the intensity of the AF line with increasing concentrations of A. Negative contributions of A exclusive lines are not expected. However, if a statistically valid relationship is observed, humans can further investigate the causes during plasma breakdown process, by analysing solely the minimum neighbouring samples spectral information.

Figure 5:
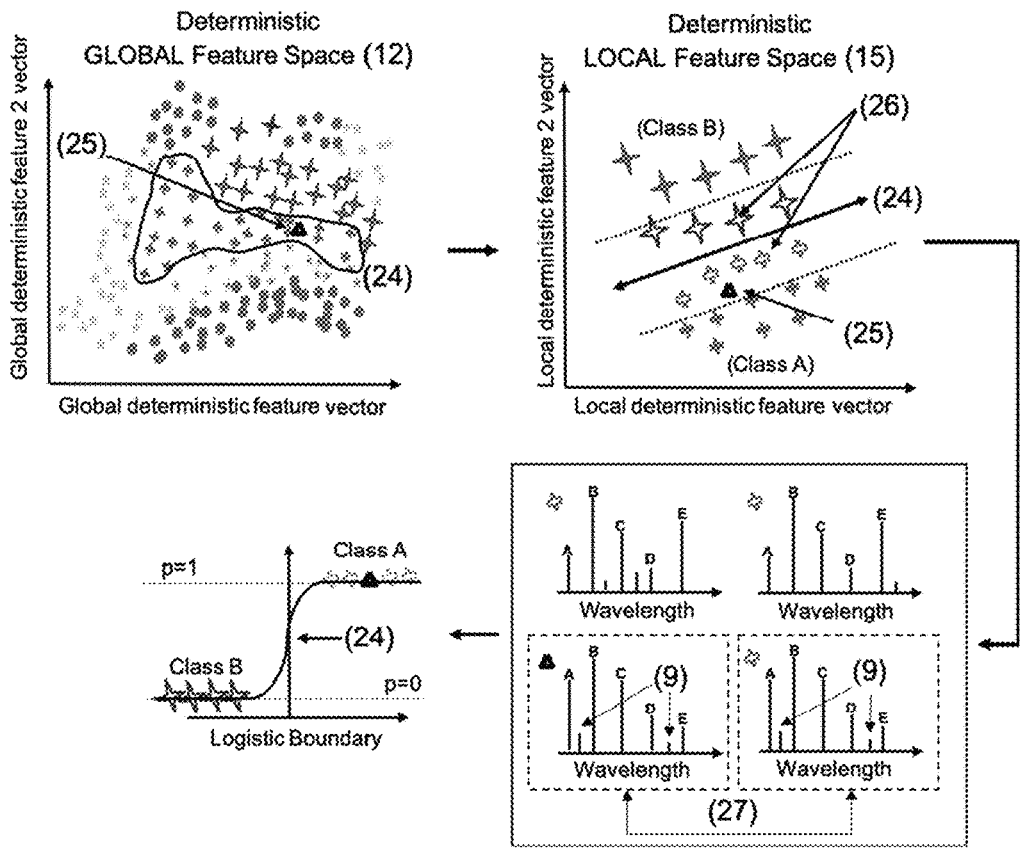
FIG. 5. is a visual demonstration of classification and identification process of unknown physical samples, whereby spectral lines extracted from an unknown physical sample are projected into a sample point (25) of the deterministic global feature space (12).

FIG. 5 presents a visual demonstration of the classification and identification method. Classification of samples is performed in the global deterministic feature space (12) by a non-linear classifier, the non-linear logistic boundary (24). Once the unknown sample point (25) is inside a class, contained within the non-linear logistic boundary (24), the probability of belonging to a particular class of constituent is derived by the local logistic regression supported by the extreme support discrimination samples (26). Once the probability of belonging to a particular class is above a threshold, the identification process is enabled, by matching (27) the extracted spectral lines of the unknown physical samples, with the corresponding neighbouring points of the particular class, identifying both constituents, molecular structure or state.

Figure 6:
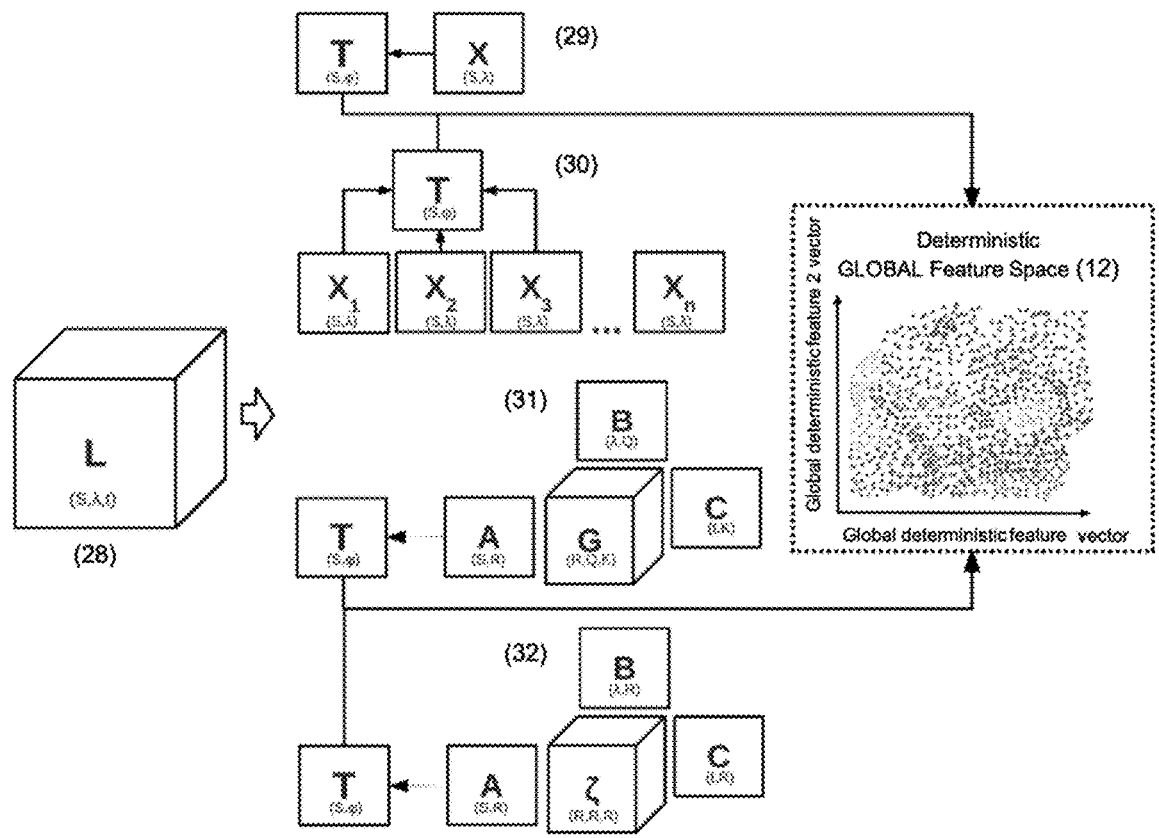
FIG. 6. presents the different methods for obtaining the deterministic global feature space (12) from a plurality of LIBS physical samples, with corresponding time-course spectra lines stored in the tensor L (28), using: i) the extracted spectral lines at the LTE (29); ii) hierarchical multi-block of unfolded tensor L (30); iii) Tucker 3D decomposition of tensor L (31); and iv) PARAFAC decomposition of tensor L (32).

FIG. 6 presents the different methods for global feature space construction specifications. Plasma-emission is dynamic, and for a particular configuration, stored in the tensor format $L(S, \lambda, t)$. In one realization, of plasma emission data at LTE (29), only the information at the LTE is used $X(S, \lambda)$ to build the feature space $T(S, \phi)$, by a change of basis (e.g. SVD, Fourier, Wavelet, Curvelet) that maximizes the co-variance with a given particular constituent.

In another realization (30), dynamic information is incorporated by hierarchical multi-block feature space information fusion. The different spectral lines at a sequence of time-steps are used to maximize the co-variance of each block $X_1, X_2, X_3 \ldots X_n(S, \lambda)$, with the constituent concentration or sample classification, in order to fuse the information of each block feature space into one single global deterministic feature space $T(S, \phi)$ that incorporates the plasma-emission dynamics.

In other realizations, dynamic information is incorporated by tensor decomposition methods. In the Tucker 3D method (31), the tensor $L(S, \lambda, t)$ is decomposed by the Tucker3D technique:

$$L(S,\lambda,t) = \Sigma^R \Sigma^Q \Sigma^{(P)} G_{r,q,p} \cdot A_{i,r} B_{j,q} \cdot C_{k,r} + E_{S,\lambda,t}$$

where, $A(S,P)$, $B(\lambda,Q)$ and $C(t,R)$ are orthogonal and can be analysed independently and combined with $G(r,q,p)$ to derive the deterministic global feature space $T(S,\phi)$ by the sample relationship $A(S,P) \rightarrow G(R,Q,P) \rightarrow B(\lambda,Q), C(t,R)$, preserving all the dynamical spectral information.

In the second method, tensor $L(S, \lambda, t)$ is decomposed by the PARAFAC method:

$$L(S,\lambda,t) = \xi_{r,r,r} \cdot A_{i,r} * B_{j,r} * C_{k,r} + E_{i,j,k}$$

where, $A(I,P)$, $B(J,Q)$ and $C(K,R)$ are non-orthogonal and $\zeta(r,r,r)$ the associated eigenvalues. By using a relevant set of eigenvalue dimensions $\zeta(r,r,r)$, $A(S,R)$, $B(\lambda,R)$ and $C(t,R)$ can be used to construct the global feature space as in the previous techniques. The quantification, classification and identification are equal for all the above construction deterministic feature space constructions.

Provided basic and advanced key concepts of the invention, it is now provided detailed support to claims with reference to the drawing figures, algorithms and results are now used to provide detailed support.

Figure 7:
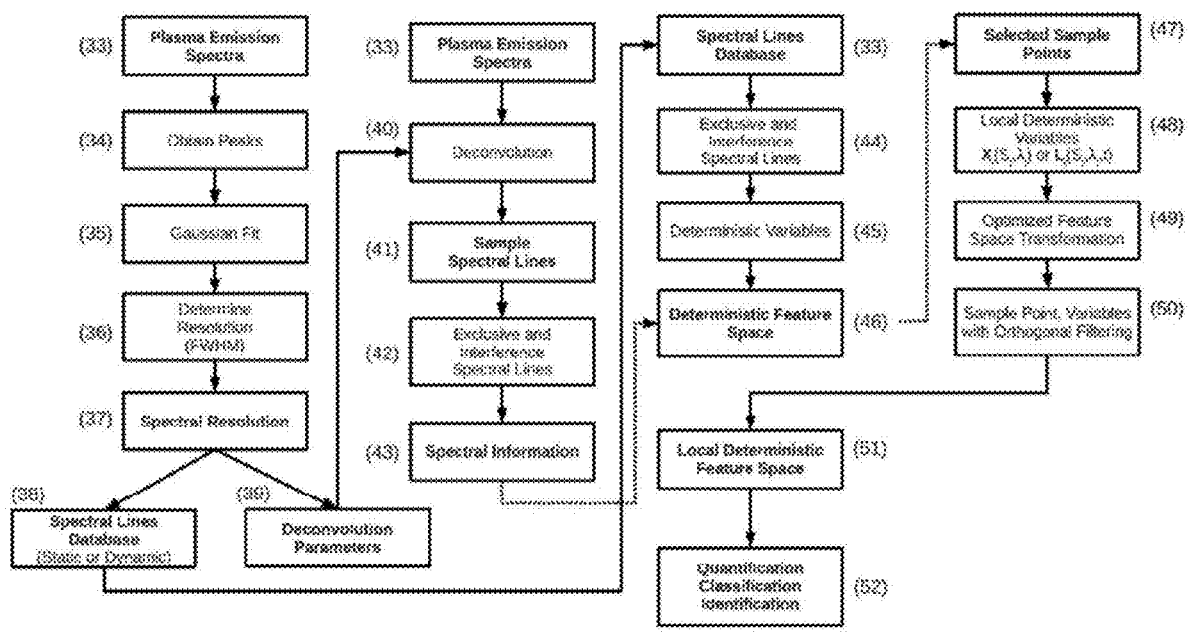
FIG. 7. presents the main steps for performing a prediction for an unknown physical sample plasma emission spectra: i) determining the spectral resolution (33), spectral lines database (39) and deconvolution parameters (39); ii) deconvolution (40) and exclusive/interference spectral lines extraction (42); and iii) deterministic feature space construction (45) and performing the quantification, classification and identification for an unknown physical sample (48).

FIG. 7 presents the main workflows for achieving quantification, classification and identification. Provided a new unknown plasma-emission spectra—$X(\lambda,t)$ or $X(\lambda)$ (33)—the process begins by obtaining the spectrum peaks (34) by determining the local maximum of pixel intensities. For these peaks (34) a Gaussian fit is performed using the neighbouring pixels of each local maximum. Peaks that do not overlap ($p<10^{-12}$) are used to determine the median spectral resolution by the corresponding full width at half maximum (FWHM).

Optical resolution determines: i) what spectral lines database can be used; and the ii) optimal deconvolution parameters to extract spectral lines from the physical spectra at sub-optical resolution. Spectral lines databases are rooted to a particular optical resolution, because these are derived using fine-tuned deconvolution parameters using the boosted Richardson-Lucy algorithm. This invention works with an existing spectral lines database, for a given fixed spectral resolution, which determines the deterministic feature space (12,46) and sample points, constituting the artificial intelligence knowledgebase. The database stores: I) spectral lines for a plurality of constituents at the LTE or for dynamic plasma-emission; ii) corresponding constituent concentration; iii) constituents chemical structure and nomenclature; and iv) constituent classification.

Therefore, the first step once an unknown physical sample plasma-emission spectrum is recorded, is to determine the optical resolution (33-37) by:
  i. obtaining spectral bands peaks by determination of local maximums (33);
  ii. performing a Gaussian function fit to each peak (34);
  iii. determining the FWHM of independent spectral lines ($p<10^{-12}$);
  iv. determining the median FWHM as the spectral resolution (36); and
  v. given the spectral resolution: a) determine what spectral lines database should be used to build the feature space and knowledgebase; and b) the Richardson-Lucy number of iterations and boosting steps.

The second step comprises the extraction of spectral emission lines (wavelengths and intensities) (43).

Deconvolution of plasma-emission spectra is used to minimize the effects of peak broadening in order to mitigate the effects of: i) natural broadening; ii) thermal effects; iii) Doppler effects; and iv) collisional broadening; so that spectral lines can be extracted with accuracy at sub-optical resolutions.

The convolution of these effects, dominated by Gaussian (G) and Lorentzian (L) profiles, leads to a given characteristic Voigt distribution profile:

$$V(\lambda,\sigma,\gamma)=\int_{-\infty}^{+\infty} G(\lambda,\sigma)*L(\lambda,\gamma)d\lambda$$

where:

$$G(\lambda,\sigma)=\frac{1}{\sigma\sqrt{2\pi}}\exp\left(\frac{\lambda^2}{2\sigma^2}\right) \text{ and } L(\lambda,\gamma)=\frac{\gamma/\pi}{\lambda^2+\gamma^2}$$

The Gaussian variance ($\sigma$) and Lorentzian scale factor ($\gamma$), are pre-determined for a given database, and the convolution balances to correct the effects of peak broadening in dynamical plasma-emission measurements.

After deconvolution, the unknown spectral lines are obtained by:
  i. determining each spectral band local maxima (34);
  ii. sub-optical spectral line extraction by performing Gaussian fit to each spectral band, to extract the fitted average wavelength ($\lambda$);

Afterwards, exclusive and interference spectral lines are determined by the following steps (42):

1. Between recorded unknown sample lines: if the interference p-value of adjacent deconvoluted spectral bands, given by the averages test, is below a threshold (e.g. $p<0.05$), the spectral line wavelength and intensity is stored as sample exclusive; on the other hand, if interference occurs, their average wavelength and intensities are stored. For each extracted line, the wavelength, intensity and resolution (FWHM) is stored, where: i) LTE as the wavelengths/intensity vector $\lambda=[\lambda_1, \lambda_2, \ldots \lambda_n |FWHM]$; and ii) dynamical plasma-emission $X(\lambda,t|FWHM)$; and afterwards, 2. Between the extracted spectral lines, $\lambda$ or $X(\lambda, t|FWHM)$, and the database spectral lines by finding for each $\lambda i$ or $Xi$, within the corresponding FWHM interval, a direct correspondence. If a direct correspondence exists, the vector $\lambda=[\lambda_1, \lambda_2, \ldots \lambda_n]$ and $X(\lambda,t)$ can be directly projected into the deterministic feature space using $\lambda=[\lambda_1, \lambda_2, \ldots \lambda n | \lambda_{null}]$ and $X(\lambda,t|\lambda_{null})$ where $\lambda_{null}$ at non-existing spectral lines. If a new independent spectra line is found, a new line is added ($\lambda_{new}$) to the database, where previous constituents samples take the null value.

Reference is made to the process of constructing the deterministic feature space (44-46). The first step of this operation is to organize the database spectral lines into exclusive, interference and unique spectral lines (44). Constituents exclusive spectral lines are directly assigned as deterministic feature space variables, whereas, interference lines are collapsed into the same feature space variable, by using the median wavelength of for example $\lambda_1, \lambda_2, \lambda_3 \rightarrow \lambda_{int}$. Wavelength interference collapse is performed using the same criteria as for an unknown sample, and the final result of this operation is the definition of spectral lines, extracted at a given spectral resolution, can be used to construct the deterministic feature space, $\lambda=[\lambda_1, \lambda_2, \lambda_3 \ldots \lambda_n]$ at the LTE, or dynamical plasma $X(\lambda,t)$, where, $\lambda=[\lambda_{1,t1}, \lambda_{2t1}, \lambda_{3\,t1}, \ldots, \lambda_{4t2}, \lambda_{5t2}, \lambda_{6t2} \ldots \lambda_n]$ (45). This operation provides the pre-processed data for constructing the deterministic feature space and corresponding self-learning artificial intelligence knowledgebase.

Any of the previous steps (33-45) ensure the correct extraction and organization of spectral lines data in the database, where spectral lines are composed of exclusive and interference spectral lines can be considered now deterministic variables. Such is because, exclusive spectral lines, directly provide a deterministic identification of particular ion element present in the plasma, as well as, exclusive lines and sequences in the plasma-emission dynamics is deterministic information on molecular breakdown, providing information on molecular structure of samples constituents. Furthermore, interference spectral lines provide information about constituents' quantification, as spectral interference intensities are related to constituents' concentrations in the plasma.

The deterministic feature space T (12) is defined by a vector basis that maximizes the co-variance with the physical sample composition Y. Composition (Y) is a provided matrix of constituents' concentrations for each corresponding physical sample. Particular cases of composition can be considered, such as: i) pure elements; ii) pure molecules; iii) element and molecular mixtures; and iv) complex samples (e.g. geological and biological). Furthermore, particular cases of constituents' compositional combinations provide unique spectra fingerprints that allow their classification, $Y \rightarrow I$, where I stores the probability of each class.

Considering a database of sample spectral lines, $X(S, \lambda)$ or $L(S, \lambda,t)$, and their corresponding composition, Y. Both can be transformed (e.g. kernel, derivative, Fourier, wavelets, curvelets) into the feature space F and K, respectively; with a basis W and C, so that, the covariance between local latent variance of F and K, T and U are maximized:

$$f(w,c)=\operatorname{argmax}(t^t u)$$

where: $f=tw^t$; and $k=uc^t$ and subjected to: $w^t w=1$ and $c^t c=1$. By applying the Lagrangian multipliers method to solve the optimization problem, one resumes it to:

$$K^t F = W\Sigma C^t$$

which is the singular value decomposition of K$^t$F, where w=W[1,], c=C[1,], with associated co-variance Σ[1,]. One can further conclude that F$^t$KKF$^t$w=pw and K$^t$FF$^t$Kc=pc. Therefore, w and c are characteristic eigenvectors of Cov (F,K)=Cov(K,F), expressed in the latent space t$^t$u, where w and c spawn a characteristic dimension of the co-variance geometry. Such singular value decomposition provides finding eigenvectors and eigen values of a matrix.

As plasma emission spectral lines carries direct information about constituents composition, one expects that after and ideal transformation of X(S, λ) or L(S, λ,t)→F and Y→K, that F and K carry the same information, that is t=u, thus maximizing f(w,c)=argmax(t$^t$u). Such means, that spectral information and composition share a common eigen-structure or geometry of characteristics.

In order to study the geometry of t$^t$u, an ortho-normal basis of eigenvectors w and c is necessary, so that, for each local F one can derive its local characteristic dimensions and geometry. Such is achieved by deflation of F and K:

$$F_{i+1} = F_i - t_i w_i^t$$

$$K_{i+1} = K_i - u_i c_i^t$$

where, $t_i = F_i w_i$, $u_i = K_i c_i$, and $w_i = w_i / \|w_i\|$, $c_i = c_i / \|\|$, $c_i = c_i / \|c_i\|$.

Recurrent deflations until the maximum rank of F or K allow to determine the geometry of co-variance and its complexity, by interpreting $t_i$, $w_i$ and their corresponding importance in relation to the captured co-variance Σ for each eigenvector, where successive deflations compose the deterministic feature space, T=[$t_i$|T] and U=[$u_i$|U]. If one assumes optimal maximization of f(w,c)=argmax(t$^t$u), then:

$$F_{i+1} = F_i - t_i p_i^t$$

$$K_{i+1} = K_i - u_i q_i^t$$

where p and q are determined by: $p_i = F_i^t t_i (t_i^t t_i)^{-1}$ and $q_i = K_i^t t_i (t_i^t t_i)^{-1}$. The optimal linear relationship between K and F can be established: F=Kβ$_{pls}$+e, where: β$_{pls}$=W (P$^t$W)$^{-1}$Q, are the partial least squares regression coefficients.

The deterministic feature space T is therefore equivalent for both K and F, and therefore, by projecting any new spectral information into T, a direct correspondence to composition is established. FIG. 6 exemplifies how to obtain T for: i) plasma-emission at the LTE, where the database spectral information X(S, λ) is directly transformed into F (29); ii) dynamical L(S, λ,t) is unfolded into X(S, λ$_t$) and transformed into F (30); iii) dynamical L(S, λ,t) is subjected to Tuker3D decomposition (31), and A(S,R) is transformed into F; and iv) dynamical L(S, λ,t) is subjected to Parafac decomposition (32), and A(S,R) is transformed into F.

Such methodology solves the issue of finding the deterministic feature space T, that holds the same eigen structure or geometry between F and K, with t u, taking as inputs X(S, λ), A(S,R). Initialization is performed by ortho-normal basis decompositions of X(S,λ) or A(S,R) (e.g. singular value decomposition, Fourier, Wavelets, Curvelets). Non-orthogonal decompositions are also possible to be used, once after decomposition, orthogonalization of the basis is forced by singular value decomposition. Step 1 initiates n random populations of F and K. When a particular basis vector is not used, $F_i=0$ or $K_i=0$. Step 2 determines the co-variance between each combination of $F_i$ and $K_i$. In Step 3, pairs of $F_i$ and $K_i$ that provide the fittest values of t$^t$u are used to perform cross-over for next generation of $F_i$ and $K_i$. Repetition of steps 2 and 3 allows to stabilize a population of $F_i$ and $K_i$. In step 5, all vector basis are concatenated into the spaces F and K. From these, only the deflations that provide t$^t$u~t$^t$t are considered to have t$^t$u consistency and are considered to have deterministic correspondence between spectral lines and composition. These are the final deterministic feature space F and compositional space K, respectively.

Such methodology increases the consistency of information between spectral (X(S,λ) or L(S,λ,t)) and compositional data Y, throughout basis transformation into F and K. F and K have a similar eigen-structure, when F=W$_f$ Σ$_f$ C$_f^t$=T$_f$C$_f^t$ and K=W$_k$ Σ$_k$ C$_k^t$=U$_k$C$_k^t$, and therefore f(w,c)=argmax (T$_f^t$U$_k$) is enforced by the similarity in eigen-structure. Another important measurement when dealing with complex eigen-structure of multiple dimensions is a way to measure the complexity of the feature space. If one considers the geometry of eigen-structures of spectroscopy information with exponential decay Σ=Σ$_r$+(Σ$_1$−Σ$_r$)e$^{-ki}$ where r is the rank eigenvalue and k the exponential decay, complexity of a dataset (ξ) can be defined as: ξ=n$_{pc}$/(k·r). The following methods of this invention aim to decrease the complexity of the global eigen-structure, so that, lower rank data is used to perform self-learned predictions and provide information that can be subjected to human interpretation and certification against state-of-the-art human knowledge.

Reference to steps in FIG. 4 (46-47), having as major milestone to perform co-variance directional search for a given unknown sample point, to provide local neighbouring sample points in the deterministic feature space (12), so that the necessary spectral information is found to construct the local deterministic feature space (15, 45) and corresponding quantification, classification and identification (48).

Such methodology provides searching for co-variant sample point neighbouring sample points of the unknown sample spectra, projected into the latent variables of the known feature space F. It starts by defining a search circle around the projected unknown T$_u$, with radius r. Within this circle, the method defines n number of directions d with search volume v. Search direction fitness is assessed by: prediction error of known sample points, predictability of T$_u$ and by number of deflations n$_{pc}$. Said search volume being one along a search direction.

i. Prediction error of known sample points ($e_i$): the known prediction error is a measurement of known sample points co-variance consistency between F and K, if so, there is consistency in known information to perform a prediction;

ii. Predictability of T$_u$: if the projected T$_u$ is inside the co-variance confidence intervals, it means that the unknown sample belongs to the same co-variance sample points group, with the same eigen-structure of F and K, and correspondence T and U, and therefore a prediction using past knowledge is possible.

iii. Number of deflations (n$_{pc-max}$): lower number of deflations provides co-variance of information using less dimensions, that is, information about known sample points co-variation between T and U is aggregated into specific features that provide local group consistency.

Such methodology may be performed into 2 different steps:

Step 1. Finding the best search direction by performing partial least squares regression with the sample points inside each search volume and assessing the prediction error ($e_i$), predictability (p) and n$_{pc}$. If search directions do not meet all these criteria, recombine the best results (e.g. evolutionary methods) to optimize new search directions until a suitable direction is found.

Step 2. Search volume minimization, by performing evolutionary search (e.g. simplex) to the direction sample points to minimize number of samples in the co-variance direction, until a stable population of known sample points is established matching the prediction error ($e_i$), predictability (p) and $n_{pc}$. Criteria.

Reference is made to procedures 47-49 in FIG. 7. After selecting the best neighbouring sample points, the local deterministic feature space is built taking into consideration only the exclusive and interference spectral lines of the corresponding sample points plasma-emission spectra (47). The deterministic local feature space is obtained by applying the previously described procedure to the corresponding local $X(S_l,\lambda_l)$ or $L(S_l,\lambda_l,t)$ variables transformation into a locally deterministic $F_1$ and $K_1$, of significantly lower rank than the original deterministic feature space and simpler co-variance structure.

Despite F and K transformations and neighbouring sample point selection decreases significantly the amount of compositional uncorrelated information, it still exists due to scattering and non-linear plasma-emission effects, such as the ablation process and plasma shielding. These affect solely line emission intensities and it is theoretically difficult to derive a signal correction for these effects, and therefore, orthogonal filtering was adopted. FIG. 4 (22) shows how choosing the minimum number of neighbouring sample points and variables allows to lower the complexity of the original data, by combining samples and variables, the original datasets $\lambda_1$ to $\lambda_4$ are reduced to one optimized dataset X.

Spectra information can be further optimized by removal of systematic variations orthogonal to compositional information, so that:

$$F=TP^t+T_oP^t_o$$

$$K=TQ^t+U_oQ^t_o$$

where T are latent variables that share common information between F and K that maximize co-variance. $T_o$ and $U_o$ the orthogonal information; that is, $T_o \perp K$ and $U_o \perp F$.

At this stage it is expected that the correct feature space transformation leads and sample neighbours lead to $T_oP^t_o \to 0$ and that $F=TP^t$.

Ideally, $U_oQ^t_o$ should also be zero. Any quantification with analytical grade quality should not have any systematic variation, orthogonal to its corresponding spectral information. When $U_oQ^t_o$ is significant, it means that the self-learning system cannot be properly trained to provide an accurate prediction, as the original training information suffers of systematic errors or information that is not contained in the spectra. Under proper conditions, $T_oP^t_o \to 0$ and $U_oQ^t_o \to 0$, and $T \approx U$ and no deflation is necessary, meaning that the information is directly related between spectra and composition.

However, in many cases, $T_oP^t_o$ is still significant, which means that the feature transformation step was not totally efficient in isolating only systematic compositional information. These situations are corrected by orthogonally filtering information in F and $K_i$ such as $F_{coor}=F-T_oP^t_o$ and $K_{coor}=K-U_oQ^t_o$, producing a local model that performs both quantification with possible interaction and interpretation by humans.

Reference is made to FIG. 5 for process of the classification and identification of samples in the deterministic feature space, by calculating the non-linear logistic boundary between classes throughout the feature space by the following steps:
determine the support discrimination samples (26) for a given boundary between two classes;
attribute a Boolean value for each class in replacement of composition (Y);
perform the previously described method to determine the local linear logistic multivariate linear model;
repeat the process (i to iii) along the boundary, and stores the successive models as the non-linear logistic boundary and predict the classification of an unknown sample by:
if the projection into the feature space is inside a particular class boundary, it is classified belonging to that corresponding classification;
if the projection lies within the boundary of two or more classes, that is, in between support discrimination samples (26), use neighbouring support sample points to build local logistic model to determine the class probability.

Reference is also made to FIG. 5, for performing the identification of constituents, such as, element and molecular ions and molecular structure. Element ions are directly identified by matching exclusive spectral lines or by rank matching of spectral lines intensities for a particular context. Molecules and their structure prediction is performed by a rank match against the pure spectra of the molecule in similar context of the sample classification result. Rank matching has two main steps: i) for each molecule inside the boundary class context, rank the spectral lines by their intensity and determine the corresponding exclusive and interference spectral lines as previously described; and ii) searching the unknown sample for equal or similar rank distances: search if all spectral lines of a particular molecule exist in the spectra, if true: a) if exclusive spectral lines are found, the molecule and corresponding structure is identified; and if not the case; b) determine the rank distance between the unknown sample and known molecule. Such methodology outputs all positive identifications for a particular unknown sample, and the rank distances to incomplete matches.

Another advantage of the proposed method is human interpretation. Reference is made to FIG. 4 (22), where a human expert can interpret why the self-learning system chosen the exclusive, context-based exclusive and interference spectral lines to quantify the A element, in the context of a molecule containing A, D, E, and F elements. In some cases, such as for trace elements, co-linear quantifications can be found, and exclusive lines present in quantification should be carefully interpreted to the context of the sample, as using co-linear information between elements has the risk of false positive/negative quantifications. To correctly diagnose, the user can access to the local deterministic feature space and verify the predictability of the selected neighbouring sample points as a measurement of context-based consistency of co-linearity. Another way that users can cure the self-learning quantification and classification is by comparing the model coefficients relevance with reference for atomic spectra emission lines (Kramida et al, 2018). The most intense emission lines of each element are generally the ones that have higher transition probabilities, as well as, transitions to the ground state should be present with significant intensity. Furthermore, ground state transitions are generally exclusive emission lines. User can also use plasma-emission simulations theoretical models to estimate ion populations using the Saha ionization equilibrium formulas and Boltzmann distributions for ion abundances distribution with correspondence to concentration in the known neighbouring samples, to further cure and reduce the possibility of false positives and negatives.

The human user can further access to the analysis of the feature space and diagnosis by the metrics presented in Table 1, for accessing:
i. Statistical representation of a local direction by the number of sample points that follow such co-variance pattern;
ii. Latent variable ratio, for diagnosing the direction complexity and representativeness
iii. Complexity decay rate: rate at which variance or co-variance eigenvectors decay along orthogonal deflations:
iv. Complexity: geometrical complexity of a given data set by characterization of number of dimensions, decay rate and number of sample points:
v. PRESS: predicted sum of squares of residuals error;
vi. Co linearity of feature space and compositional space;
vii. Model variance: amount of variance used in model prediction;
viii. Predicted variance: predicted K variance or quantitative/classification information
ix. Spectral uncorrelated information: information that does not quantifies or classifies a given compositional or classification information
x. Compositional unrelated information: information in compositional data that is not contained in the spectra; and
xi. Explainable co-variance between F and K information.

Humans can also interpret the following information:
i. Latent space basis P: spectral lines and relative importance that directly contribute for the co-variance with $K_i$ that is, constituents and their concentrations;
ii. Latent space basis Q: compositional or classification information that is directly related to spectral information, that is, spectral lines wavelengths and intensities;
iii. Latent Space basis $P_o$: spectral lines that are not related to the compositional information, and therefore should be further investigated for identification;
iv. Latent Space basis $Q_o$: composition that is not reflected in spectral information, and therefore users can devise further investigations why such effects happen;
v. Latent space coordinates $T_o$: sample groups clusters that should have their quantifications performed so there the self-learning system can provide predictions.
vi. Latent space coordinates $U_o$: discovery of groups of samples that do not have spectral information, such as, samples only with trace elements to provide information how to improve the physical measurements.

With all the information provided, humans can understand if the automated self-learning system is operating correctly, as well as, interpreting complex spectral information.

EXAMPLES

A. Elements Identification and Quantification

Figure 8:
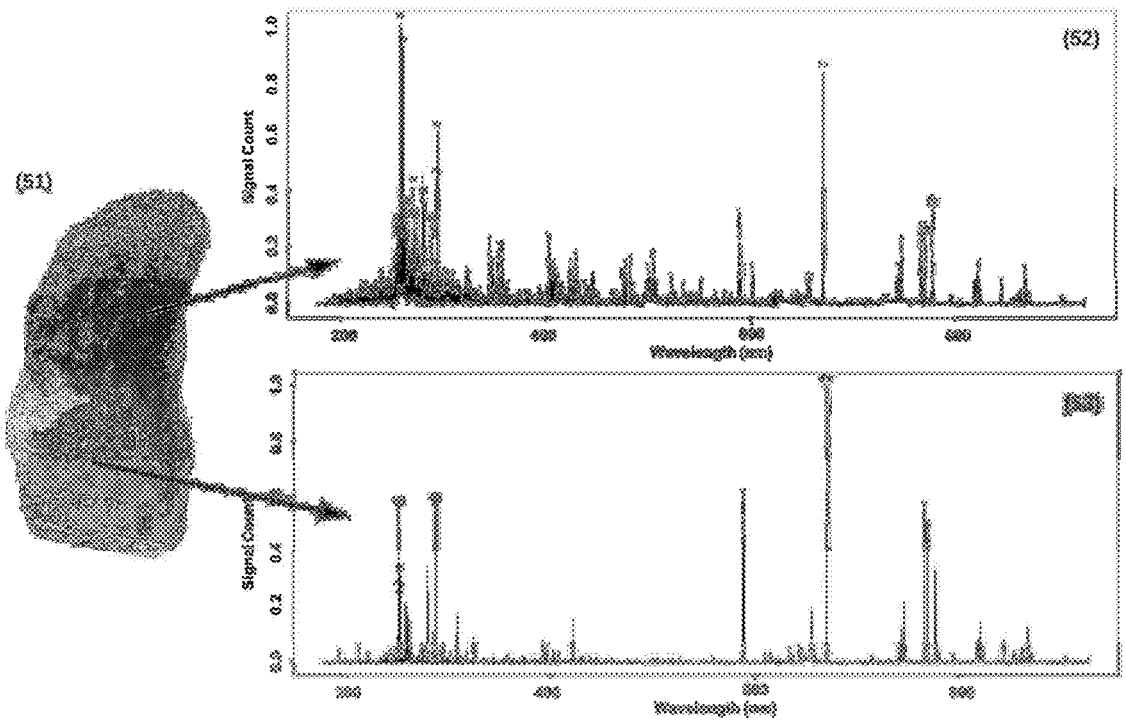
FIG. 8. presents a LIBS characterisation of a wolframite ore from Bejanca mine (51). Wolframite mineral (black ore) (52) is enclosed in quartz (53).

LIBS mineral and element identification is presented with two case studies of real mine ore: i) wolframite from Bejanca mine (Vouzela-Viseu, Portugal); ii) lithium from Gelfa (Gelfa, Portugal). FIG. 8 presents the typical wolframite containing ore from Bejanca mine (51). The wolframite mineral (black) is enclosed in quartz. Wolframite is composed by iron and tungsten. Exclusive peaks from Iron and Tungsten are located between 200 and 400 nm (52). Both elements have significant spectral lines in these wavelengths, and therefore a high-resolution spectrometer and sub-optical spectral lines extraction is necessary to resolve and identify them. In 53, the LIBS spectra of quartz surrounding the wolframite. Quartz is mostly silicon, but it shows some iron content. No Tungsten was found in the quartz mineral. Both quartz and wolframite exhibit significantly different spectra fingerprints, which makes them very easy to classify and discriminate using LIBS spectroscopy.

Figure 9:
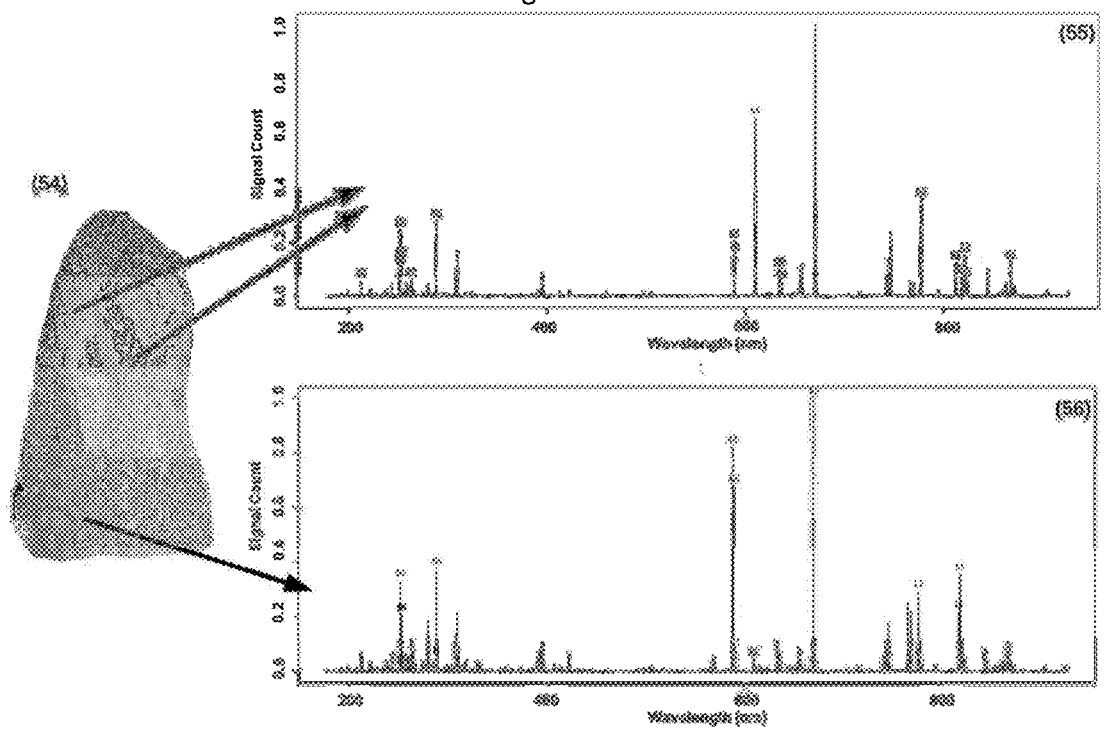
FIG. 9. presents a LIBS characterisation of a lithium ore from Gelfa-Portugal (54), where the lithium vein (55) is surrounded by quartz (55).

FIG. 9 presents the LIBS characterization of the lithium ore from Gelfa-Portugal (54). In this example, the lithium vein is surrounded by quartz. The LIBS spectra of the lithium vein exhibit an extremely high emission at the lithium band 610.20 nm (55), which is an exclusive spectral line from lithium. The same peak exists in the surrounding quartz, but with much less intensity, due to fluidic inclusions that are possible to be observed under a microscope. The invention disclosed herein allowed the successful identification of the presence of lithium in the lithium vein, discriminating between the vein and surrounding quartz.

Reference is made to Table 2, presenting lithium quantification benchmarks of lithium ores. LIBS lithium quantification was benchmarked against the lithium spectral lines intensity and lithium concentration was studied. The 610.20 nm proved to hold a statistically relevant relationship to lithium concentration. Results show high-variance in the calibration model, being unable to correctly predict lower lithium concentrations. Using the full spectral interference may increase the accuracy. A multivariate partial least squares model was developed. Although bias and variance are reduced, the PLS model still over estimates low concentration lithium minerals (see Table 1). Results show that LIBS spectral line intensities correspondence to element concentration is a highly non-linear and multi-scale phenomena, because linear models are not able to provide analytical quality bias vs variance quantifications in LIBS spectroscopy.

Blind testing gives clear evidence that linear models obtained with the line intensity at 620 nm and multivariate PLS model under estimate the lithium content in the vein, and highly over-estimate in the surrounding quartz (see Table 2). The method proposed in this invention, was able to correctly estimate the amount of lithium in quartz show to be below 1% (Table 2).

Furthermore, blind test prediction using the method of this invention is presented in Table 3 for the following elements: Al, Si, Li, Fe, Na, K and Rb. One can observe that the correlation is very significant across the normalized concentration (%) range, and prediction error is significantly small.

Figure 10:
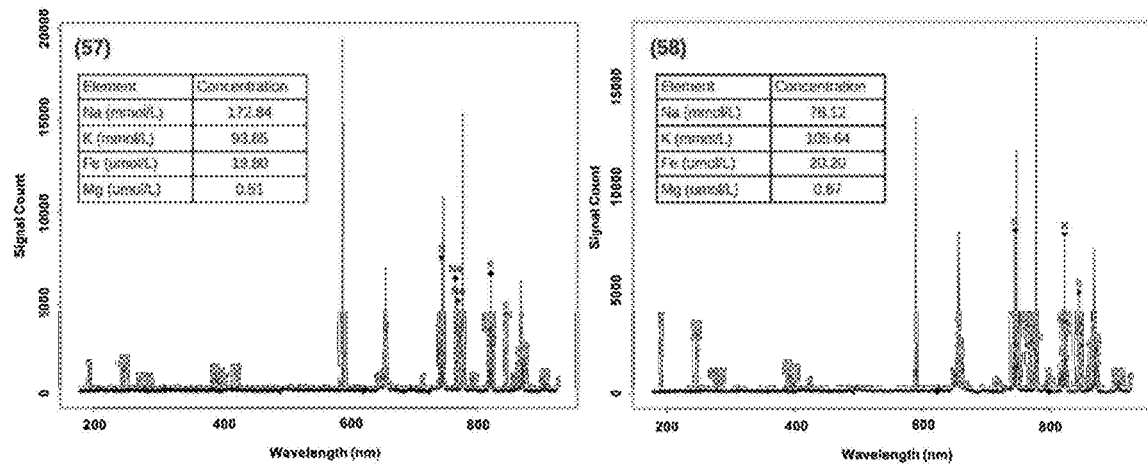
FIG. 10. presents the quantification of Na, K, Fe and Mg in dog and cat blood.

In another embodiment exemplified in FIG. 10, presents the identification and quantification of Na, $K_i$ Fe and Mg in dog (57) and cat (58) blood, as reference of complex biological samples, with emphasis in veterinary and human health-care applications of plasma induced spectroscopy.

Figure 11:
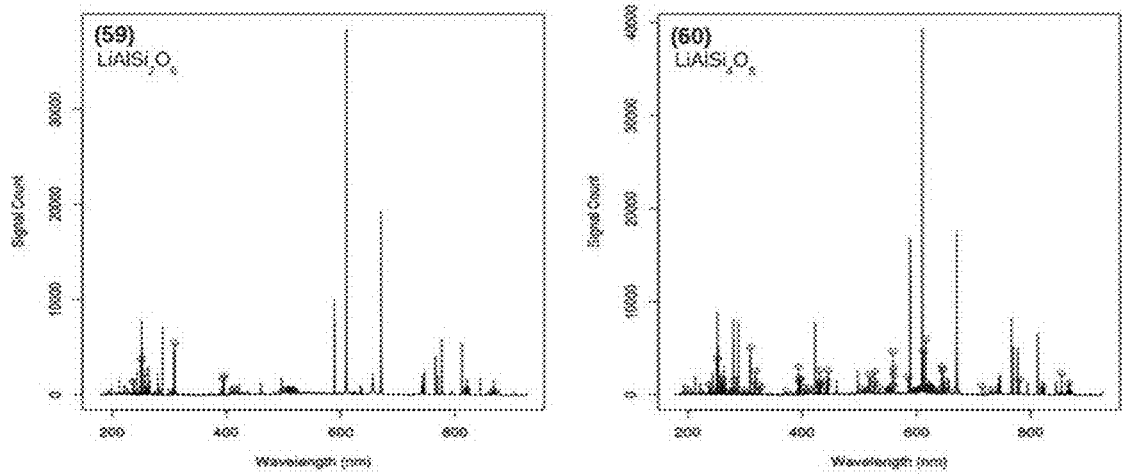
FIG. 11. presents the plasma emission spectra of lithium ore crystals in the structure of spodumene (59) and petalite (60).

In another embodiment presented in FIG. 11, the identification of spodumene ($LiAlSi_2O_6$) (59) and petalite ($LiAlSi_4O_8$) (60). These lithium crystals have the same elements in their composition, and therefore share the main ion spectral lines of Li, Al, Si and O. The different crystalline structure leads to exclusive spectral lines of each crystal during plasma formation that is presented by a circle in FIG. 11. These spectral lines are used to identify the type of crystal in a mineral or ore sample, as well as, it can be used to quantify and classify the mineral purity.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

TABLE 1

Human interaction diagnosis to the feature space

| Description | Formula | Diagnosis |
|---|---|---|
| Statistical representation | $n$ | Number of data at a local direction |
| Latent ratio | $n_{pc}/n_{Rank}$ | Ratio of latent variables vs rank of data |
| Complexity decay rate | $k$ | Complexity diagnosis of local deterministic feature space |
| Complexity | $C = n_{pc}/(n \cdot k)$ | Complexity of local deterministic feature space |
| PRESS | $\Sigma^n_i (K_i - K_{i,pred})^2 / (n - p)$ | Predicted sum of squares |
| Collinearity of feature space | $cov(T,U)$ | Diagnosing effectiveness of feature space transformation for eigenstructure similarity between F and K. |
| Model Variance | $1 - \Sigma E_F^2 / F^2$ | Variance in F |
| Predicted variance | $1 - \Sigma(TQ^t - K)^2 / \Sigma K^2$ | Predicted model variance of K |
| Spectral Unrelated information | $\Sigma(T_o P_o^t)^2 / \Sigma F^2$ | Percentage of unrelated spectral information with composition |
| Compositional Unrelated information | $\Sigma(U_o Q_o^t)^2 / \Sigma K^2$ | Percentage of unrelated compositional information with spectral information |
| Co-variance in F | $\Sigma(TP^t)^2 / \Sigma F^2$ | Ratio of information in F related to K |
| Co-variance in K | $\Sigma(TQ^t)^2 / \Sigma K^2$ | Ratio of information in K related to R |

TABLE 2

Quantification of Lithium in Lithium ore.

| Sample No. | Main mineral | Expected Li (%) | Intensity @ 620.10 nm | PLS regression | Sub-optical Self-Learning |
|---|---|---|---|---|---|
| 1 | Spodumene | 7.79 | 6.69 | 5.40 | 6.64 |
| 2 | Petalite | 4.45 | 3.40 | 5.97 | 4.76 |
| 3 | Petalite | 4.45 | 6.01 | 4.77 | 5.77 |
| 4 | Petalite | 4.45 | 6.57 | 6.60 | 4.81 |
| 5 | Elbaite | 1.66 | 3.0 | 2.35 | 1.71 |
| 6 | Spodumene | 7.79 | 8.72 | 7.64 | 7.87 |
| 7 | Litiophilite | 9.11 | 8.95 | 8.93 | 9.45 |
| 8 | Spodumene | 7.5 | 8.43 | 8.32 | 5.67 |
| 9 | Quartz | 0 | 3.03 | 3.20 | 0.69 |

TABLE 3

Quantification of Aluminum, Silicon, Iron, Sodium, Potassium and Rubidium in geological standards blind samples.

| Sample # | Aluminum | | Silicon | | Iron | | Sodium | | Potassium | | Rubidium | |
|---|---|---|---|---|---|---|---|---|---|---|---|---|
| | Exp | Pred | Exp | Pred | Exp | Pred | Exp | Pred | Exp | Pred | Exp | Pred |
| 1 | 18.45 | 19.19 | 65.39 | 70.95 | 0.90 | 1.22 | 0.22 | 0.24 | 5.89 | 5.73 | 0.097 | 0.074 |
| 2 | 27.48 | 24.04 | 65.39 | 64.67 | 0.60 | 0.52 | 0.00 | −0.04 | 2.66 | 2.27 | 0.042 | 0.040 |
| 3 | 28.93 | 31.98 | 63.60 | 59.94 | 0.40 | 0.045 | 0.05 | −0.20 | 6.97 | 6.08 | 0.087 | 0.081 |
| 4 | 43.85 | 42.49 | 48.58 | 53.15 | 0.50 | 0.58 | 0.05 | 0.12 | 1.08 | 0.72 | 0.019 | 0.023 |
| 5 | 27.48 | 28.49 | 37.89 | 39.14 | 0.80 | 0.88 | 0.05 | 0.29 | 4.81 | 4.41 | 0.058 | 0.057 |
| 6 | 18.45 | 18.59 | 65.39 | 63.30 | 0.80 | 1.10 | 0.87 | 0.55 | 1.99 | 3.07 | 0.029 | 0.027 |
| 7 | 18.25 | 18.27 | 63.60 | 58.69 | 0.70 | 1.07 | 2.43 | 2.42 | 6.31 | 6.87 | 0.084 | 0.076 |
| 8 | 16.41 | 16.91 | 65.59 | 65.02 | 0.30 | 0.38 | 0.00 | 0.08 | 1.99 | 2.15 | 0.056 | 0.077 |
| 9 | 16.41 | 16.16 | 77.80 | 73.12 | 5.60 | 5.67 | 0.22 | 0.19 | 2.41 | 2.79 | 0.015 | 0.015 |
| 10 | 16.41 | 17.28 | 77.80 | 77.36 | 6.20 | 6.06 | 0.24 | 0.39 | 3.32 | 3.59 | 0.020 | 0.018 |

REFERENCES

Kramida, A., Ralchenko, Yu., Reader, J. and NIST ASD Team (2018). NIST Atomic Spectra Database (version 5.5.6), [Online]. Available: https://physics.nist.gov/asd [Tue May 29 2018]. National Institute of Standards and Technology, Gaithersburg, Md.

D. W. Hahn and Omenetto N. Laser-induced breakdown spectroscopy (libs), part i: review of basic diagnostics and plasma-particle interactions: still-challenging issues within the analytical plasma community. Appl Spectrosc., 64(12):335-66, 2010.

A. Cousin, O. Forni, S. Maurice, O. Gasnault, C. Fabre, V. Sautterd, R. C. Wiense, and J. Mazoyera. Feasibility of generating a useful laser-induced breakdown spectroscopy plasma on rocks at high pressure: preliminary study for a Venus mission. Spectrochim. Acta Part B,

The invention claimed is:

1. A method for characterization of one or more constituents in a physical sample from electromagnetic spectral information of such physical sample, each constituent consisting of one or combinations of chemical elements and/or their isotopes, molecules and/or their conformations or states, comprising the following steps:
   obtaining a resolution of electromagnetic spectral information,
   extracting, where the spectral resolution corresponding to the spectral information is sub-optical, one or more spectral lines from said electromagnetic spectral information,
   projecting said spectral lines into a sample point of a deterministic feature space using a computational apparatus, such deterministic feature space consisting of a multiple dimension vector space comprising a plurality of spectral lines with a predetermined vector basis, such plurality of spectral lines with a predetermined vector basis:
      being stored in a database and having been obtained by sub-optical spectral resolution extraction, and
      corresponding to a plurality of known constituents,
   wherein each dimension of said multiple dimension vector space is a prediction feature of the one or more constituents in said physical sample to which the electromagnetic spectral information corresponds, such prediction feature providing determination of quantity, classification and/or identification of one or more constituents in said physical sample; and
   wherein the method further comprises the following steps:
      selecting a minimum of neighbouring sample points within said deterministic feature space, corresponding to a known constituent quantity, such that the projected sample point maximize the covariance with the corresponding minimum neighbouring points,
      selecting, from the minimum neighbouring points, exclusive, interference and unique spectral lines, thereby deriving a local feature space within the neighbouring sample points, and
      predicting the quantification of the constituent from the physical sample to be quantified by correlating the known constituents from the local feature space, taking into consideration the projected spectral lines of said physical sample to be quantified into the covariance feature space of the selected neighbouring sample points.

2. Method according to claim 1 wherein:
   electromagnetic spectral information comprises one or more electromagnetic spectra corresponding to the physical sample.

3. Method according to claim 1 wherein it further comprises the following steps:
   selecting a minimum of neighbouring sample points within the deterministic feature space, such that such neighbouring sample points belong to a particular class, by determining if the projected sample point is inside a predetermined region of the deterministic feature space, such region being delimited by a non-linear logistic boundary, and
   for the minimum of neighbouring sample points delimited inside said region, selecting exclusive, interference and unique spectral lines to derive a local feature space, thereby providing matching within the neighbouring sample points and said sample point.

4. Method according to claim 3 wherein the referred non-linear logistic boundary is derived from:
   declaration as variables of the said deterministic feature space using all existing spectral lines available of constituents from said database, into a matrix;
   performing the decomposition of the previous matrix, such decomposition being such that it provides searching and to maximize covariance of said constituents, determining a multiple dimension vector space that spawns the said deterministic feature space, preferably one of the following singular value decomposition, Fourier, wavelets or curvelets transforms;
   projecting spectral information into a sample point of the multiple dimension vector basis, said deterministic feature space;
   defining a plurality of search directions in said deterministic feature space;
   defining a plurality of directional search volumes contained within said feature space, each being defined as a region of the feature space that includes the said projected sample point, that extends along a search direction by a search length, where the said search direction is defined by the logistic function;
   selecting the search direction that has a corresponding prediction model that has maximum predictability of classification or identification of the constituent to be classified, using the projected sample points within a selected directional search volume corresponding to the selected direction as the selected minimum neighbouring sample points;
   determine the distance to the prediction model and define the support discrimination samples, that sustain the said non-linear logistic boundary;
   determine the extreme support discrimination samples and selecting the search direction that has a corresponding prediction model that has maximum predictability of classification or identification of the constituent to be classified, using the projected sample points within a selected directional search volume corresponding to the selected direction as the selected minimum neighbouring sample points;
   performing the previous operation recursively, until all the said non-linear logistic boundary is determined for a particular class.

5. Method according to claim 3 wherein, where the spectral resolution is sub-optical and said sample point is inside the said non-linear logistic boundary, quantification of a constituent in said sample is further obtained from:

provided a particular classification, the relevant lines are obtained by determining exclusive, interference and unique spectral lines;

assembling a local feature space, said local feature space consisting of a sub-space of the deterministic feature space, using the exclusive, interference and unique spectral lines of the particular said classification given by the deterministic feature space;

verify if the said sample point has the per-determined relevant spectral bands, the exclusive, said interference and unique spectral lines;

If the said sample point has the said exclusive, said interference and unique spectral lines, use the said neighbouring sample points as support for local multi-variable model using orthogonal filtering of non-contributing plasma effects for quantification, minimizing the covariance eigenvectors until the relevant set of neighbouring sample points and spectral lines of the said sub-space is attained;

performing the said physical sample quantification of constituents, using the predetermined said local multi-variable modelling.

6. Method according to claim 3 wherein, where the spectral resolution is sub-optical and said sample point is inside the said non-linear logistic boundary, quantification of a constituent in said physical sample is further obtained from:

provided a particular classification, the relevant lines are obtained by determining exclusive, interference and unique spectral lines;

assembling a local feature space, such local feature space consisting of a sub-space of the global feature space, using the referred exclusive, interference and unique spectral lines of the particular said classification given by the deterministic feature space;

verify if the said sample point has predetermined local feature space spectral bands;

identify particular elements and their corresponding ions/isotopes by their exclusive spectral lines;

identify particular molecules and their conformations or ions, by matching their exclusive, interference and unique spectral lines of the said physical sample, with pre-determined specific spectral lines from obtained said, spectral lines database of constituents;

identification of particular ionic re-arrangements during plasma breakdown process, characteristic of a particular chemical structure, conformation/states and/or constituents due to chemical reactions inside the plasma from said physical sample, by matching against an obtained said database given the said neighbouring sample points of the said local feature space;

provide a matching index, based on line intensities order of magnitude of exclusive, interference and unique spectral lines of said sample point neighbours;

provide, if match exists, at least one chemical structure, implicit in the physical sample.

7. Method according to claim 1 wherein the referred electromagnetic spectral information is obtained from a plasma inducing spectroscopy method, preferably Laser-Induced Breakdown Spectroscopy (LIBS).

8. Method according to claim 7 wherein the referred electromagnetic spectral information comprises spectral information variation in time, for a certain time lapse, said plasma inducing spectroscopy method having impacted upon the physical sample during such time lapse.

9. Method according to claim 8 wherein the referred variation in time is discrete, the electromagnetic spectral information thereby comprising a plurality of electromagnetic spectrums, each spectrum corresponding to an instant in the referred time lapse, whereby spectral lines are extracted for each spectrum of said plurality of spectrums, thereby resulting in one or more spectral lines for each spectrum.

10. Method according to claim 8 where the referred deterministic feature space is obtained by a hierarchical multi-block technique or tensor decomposition.

11. Method according to claim 1 wherein selecting the minimum of neighbouring sample points within the said feature space further comprises:

declaration as variables of the said deterministic feature space using all existing spectral lines available constituents in said database, into a matrix of known physical samples;

performing decomposition of the previous matrix, such decomposition being such that it provides searching and to maximize covariance of said constituents, determining a multiple dimension vector space that spawns the said deterministic feature space;

projecting spectral information into a sample point of the multiple dimension vector space, said deterministic feature space;

defining a plurality of search directions in said deterministic feature space;

defining a plurality of directional search volumes contained within said feature space, each being defined as a region of the feature space that includes the said projected sample point, that extends along a search direction by a search length;

calculating a plurality of corresponding prediction models, for each said search direction and corresponding search volume, in particular such prediction models corresponding to the maximization of covariance between samples and constituent quantification;

selecting the search direction that has a corresponding prediction model that has maximum predictability of quantification of the constituent to be quantified, using the projected sample points within a selected directional search volume corresponding to the selected direction as the selected minimum neighbouring sample points, and, preferably:

where the spectral information consists of a single electromagnetic spectrum, the decomposition is obtained by one of the following:
singular value decomposition, Fourier, wavelets or curvelets transforms, and/or where the spectral information consists of a plurality of electromagnetic spectrums, the referred matrix consists of a tensor or an n-unfolded matrix, and said decomposition is obtained by one of the following:
tucker3D, PARAFAC or unfolding the tensor by hierarchical multi-block time-course decompositions, and, subsequently to decomposition, compression of information is performed using:
singular value decomposition, Fourier, wavelets or curvelets transforms of time-spectra spaces, given by, the tensor decompositions, such as, Tucker3d or Parafac, to compress the deterministic feature space.

12. Method according to claim 1 wherein it further comprises the following steps:

determining a prediction error distribution associated with said minimum of neighbouring sample points, selected for a constituent quantification, classification or identification;

obtaining the p-value from the said prediction error distribution, given the projected spectral lines of the said physical sample, by determining the error distance within the said minimum of neighbouring sample points covariance corresponding to a selected for a constituent quantification, classification or identification; and using the calculated p-value as a measure of predictability of quantification, classification or identification of a given chemical elements and their isotopes, molecules and their conformations/states and/or constituents of the said physical sample, thereby determining the predictability of a determined quantification or classification of said one or more constituents in the physical sample, to which said electromagnetic spectrum corresponds.

13. Computational apparatus with self-learning for characterization of one or more constituents in a physical sample, each constituent consisting of one or combinations of chemical elements and/or their isotopes, molecules and/or their conformations or states, wherein it is configured to implement a method for characterization of one or more constituents in a physical sample from electromagnetic spectral information of such physical sample, each constituent consisting of one or combinations of chemical elements and/or their isotopes, molecules and/or their conformations or states, the method comprising the following steps:

obtaining the resolution of electromagnetic spectral information, extracting, where the spectral resolution corresponding to the spectral information is sub-optical, one or more spectral lines from said electromagnetic spectral information, projecting said spectral lines into a sample point of a deterministic feature space, such deterministic feature space consisting of a multiple dimension vector space comprising a plurality of spectral lines with a predetermined vector basis, such plurality of spectral lines with a predetermined vector basis:

being stored in a database and having been obtained by sub-optical spectral resolution extraction, and corresponding to a plurality of known constituents, wherein each dimension of said multiple dimension vector space is a prediction feature of the one or more constituents in said physical sample to which the electromagnetic spectral information corresponds, such prediction feature providing determination of quantity, classification and/or identification of one or more constituents in said physical sample, wherein the apparatus preferably further comprises a spectroscopy device able to induce a plasma state in a physical sample, said spectral information being obtained from said spectroscopy device, the spectroscopy device preferably consisting of a LIBS device; and wherein the method further comprises the following steps:
selecting a minimum of neighbouring sample points within said deterministic feature space, corresponding to a known constituent quantity, such that the projected sample point maximize the covariance with the corresponding minimum neighbouring points, selecting, from the minimum neighbouring points, exclusive, interference and unique spectral lines, thereby deriving a local feature space within the neighbouring sample points, and predicting the quantification of the constituent from the physical sample to be quantified by correlating the known constituents from the local feature space, taking into consideration the projected spectral lines of said physical sample to be quantified into the covariance feature space of the selected neighbouring sample points.

14. Computational apparatus according to claim 13, wherein it comprises a spectroscopy device, such spectroscopy device preferably consisting of a LIBS device from which said spectral information is obtained from, the computational apparatus being further configured to obtain spectral information from the spectroscopy device during a predetermined time lapse and thereby obtaining spectral information which consists of a plurality of electromagnetic spectrums corresponding to several instants in said predetermined time lapse, the plasma inducing spectroscopy device having impacted upon the physical sample during such time lapse.

15. Non-transitory storage media including program instructions executable to carry out a method for characterization of one or more constituents in a physical sample from electromagnetic spectral information of such physical sample, each constituent consisting of one or combinations of chemical elements and/or their isotopes, molecules and/or their conformations or states, the method comprising the following steps:

obtaining the resolution of electromagnetic spectral information, extracting, where the spectral resolution corresponding to the spectral information is sub-optical, one or more spectral lines from said electromagnetic spectral information, projecting said spectral lines into a sample point of a deterministic feature space, such deterministic feature space consisting of a multiple dimension vector space comprising a plurality of spectral lines with a predetermined vector basis, such plurality of spectral lines with a predetermined vector basis:

being stored in a database and having been obtained by sub-optical spectral resolution extraction, and corresponding to a plurality of known constituents, wherein each dimension of said multiple dimension vector space is a prediction feature of the one or more constituents in said physical sample to which the electromagnetic spectral information corresponds, such prediction feature providing determination of quantity, classification and/or identification of one or more constituents in said physical sample; and wherein the method further comprises the following steps:
selecting a minimum of neighbouring sample points within said deterministic feature space, corresponding to a known constituent quantity, such that the projected sample point maximize the covariance with the corresponding minimum neighbouring points, selecting, from the minimum neighbouring points, exclusive, interference and unique spectral lines, thereby deriving a local feature space within the neighbouring sample points, and predicting the quantification of the constituent from the physical sample to be quantified by correlating the known constituents from the local feature space, taking into consideration the projected spectral lines of said physical sample to be quantified into the covariance feature space of the selected neighbouring sample points.

16. Computational apparatus according to claim 13 wherein electromagnetic spectral information comprises one or more electromagnetic spectra corresponding to the physical sample.

17. Non-transitory storage media according to claim 15 wherein electromagnetic spectral information comprises one or more electromagnetic spectra corresponding to the physical sample.

* * * * *